United States Patent [19]

Kojima et al.

[11] Patent Number: 5,372,702
[45] Date of Patent: Dec. 13, 1994

[54] COMPOSITION FOR USE IN THE PRODUCTION OF COMPOSITE CARBON MATERIALS, COMPOSITION CARBON MATERIAL PRODUCED THEREFROM, AND PROCESS FOR PRODUCING THE SAME

[75] Inventors: Takashi Kojima; Hitoshi Sakamoto, both of Ibaraki, Japan

[73] Assignee: Mitsubishi Gas Chemical Company, Inc., Tokyo, Japan

[21] Appl. No.: 871,917

[22] Filed: Apr. 22, 1992

[30] Foreign Application Priority Data

Apr. 23, 1991 [JP] Japan .................. 3-117895

[51] Int. Cl.⁵ .................. C10C 3/00; C08L 95/00
[52] U.S. Cl. .................. 208/39; 208/40; 208/44; 106/274
[58] Field of Search .................. 208/40, 44, 39; 106/274

[56] References Cited

U.S. PATENT DOCUMENTS

| | | | |
|---|---|---|---|
| 2,500,208 | 3/1950 | Shea et al. | 106/284 |
| 2,500,209 | 3/1950 | Shea et al. | 18/54.7 |
| 4,490,329 | 12/1984 | Hare et al. | 419/51 |
| 4,789,455 | 12/1988 | Mochida et al. | 208/39 |
| 4,891,126 | 1/1990 | Mochida et al. | 208/39 |
| 4,996,009 | 2/1991 | Hasegawa | 423/449.6 |
| 5,182,010 | 1/1993 | Mochida et al. | 208/39 |
| 5,238,672 | 8/1993 | Sumner et al. | 208/39 |

FOREIGN PATENT DOCUMENTS

| | | | |
|---|---|---|---|
| 430689 | 11/1990 | European Pat. Off. | C10C 3/00 |
| 3311424 | 9/1983 | Germany . | |
| 212275 | 8/1989 | Japan | C04B 35/52 |
| 239060 | 9/1989 | Japan | C04B 35/52 |

OTHER PUBLICATIONS

High Temperatures-High Pressures vol. 8, 1976, pp. 307-316, month not available.

Chemical Abstracts, vol. 86, 13 Jun. 1977, Columbus, Ohio, US; abstract no. 173502u, Rhee, B. 'A simplified process for carbon-carbon composites production'. p. 173505.

Thermochimica Acta, vol. 62, No. 2-3, 1983, pp. 237-248 Charit, J. and AL. 'Thermogravimetric characterization of the suitability of various pitches as matrices for carbon-carbon composites' pp. 246-247, "The effect of the addition of sulfur and conclusions", month not available.

Primary Examiner—Paul Lieberman
Assistant Examiner—P. C. Hailey
Attorney, Agent, or Firm—Roylance, Abrams, Berdo & Goodman

[57] ABSTRACT

The improved composition for use in the production of composite carbon materials comprises a mesophase pitch containing at least 80% of an optical anisotropic phase and having a softening point of no higher than 250° C., and sulfur present in an amount of 6–35 parts by weight per 100 parts by weight of said mesophase pitch. Said composition may be heated together with an aggregate and subsequently shaped to yield a composite carbon material. The improved process for producing a composite carbon material comprises impregnating an aggregate with said composition as it is melted, shaping the mixture in a temperature range of 150°–350° C, and then carbonizing the shaped part.

5 Claims, No Drawings

COMPOSITION FOR USE IN THE PRODUCTION OF COMPOSITE CARBON MATERIALS, COMPOSITION CARBON MATERIAL PRODUCED THEREFROM, AND PROCESS FOR PRODUCING THE SAME

BACKGROUND OF THE INVENTION

This invention relates to a composition that is advantageously used as a matrix or a binder in the production of composite carbon materials. The invention also relates to a composite carbon material that is produced using that composition, as well as a process for producing that composite carbon material.

Composite carbon materials hold much promise as braking materials in aircraft and automobiles, structural materials of nuclear reactors, spacecraft and aircraft, and as corrosion-resistant or sliding materials in various industries. In this regard, it is worth particular mentioning that methods are being studied today for producing high-performance composite carbon materials that are improved in strength and other characteristics using mesophase pitch as a binder or matrix in place of heretofore used phenolic resins, furan resins and tar pitch.

However, the yield of carbonization of binder or matrix mesophase pitch which is used with an aggregate in the production of various composite carbon materials is not satisfactorily high, and gases or volatiles that occur in the process of heat treatment will produce fine bubbles in the product, causing a decrease in its density and mechanical strength. This makes it necessary for the impregnation with pitch and the carbonization at high temperature to be repeated several times. As a further problem, pitch will often flow out of the shaped part in the process of carbonization, causing the product to deform and lose dimensional stability.

The process of manufacturing composite carbon materials comprises either heating under pressure up to a temperature of ca. 600° C. at which pitch turns to coke or carbonizing at a very small rate of temperature elevation not exceeding 1° C./min. Hence, the production process of composite carbon materials is not only complicated but also costly because of the long time needed to obtained the final product.

Various attempts have recently been made to solve the aforementioned problems of the art. See, for example, Japanese Patent Public Disclosure No. 212275/1989, which describes a process for producing a carbon-fiber reinforced composite carbon material that comprises impregnating a fiber-preformed part with carbonaceous pitch and performing stabilization several times in an oxidizing gas atmosphere, followed by carbonization and graphitization. Also see Japanese Patent Public Disclosure No. 239060/1989, which proposes that fine stabilized spheres of mesophase pitch having a random configuration of optical anisotropic structures should be used as a matrix for carbon-fiber reinforced composite carbon materials.

Those methods are both intended to prevent the formation of bubbles, dislodging of the matrix and the deformation of a shaped part which occur on account of the melting or flowing out of a pitch or the evolution of gases in the process of carbonization. However, the method proposed by Japanese Patent Public Disclosure No. 212275/1989 has the disadvantage of being costly since it is necessary to repeat the cycles of stabilization and cooling. The proposal made by Japanese Patent Public Disclosure No. 239060/1989 is based on the use of a stabilized pitch, so the degree of pitch impregnation is insufficient to produce a product of high performance.

It has also been attempted to solve the problems at issue by adding a polymerization accelerator to the pitch. See, for example, U.S. Pat. No. 2,500,208 and 2,500,209, which propose the use of an aromatic nitro compound as a polymerization accelerator. "Tanso (Carbon)", No. 119, pp. 190–196, 1984 describes the preparation of a sample of shaped carbon part using a sulfur-doped pitch.

In certain cases, the methods proposed by the U.S. patents, supra, achieve an appreciably high degree of effectiveness in promoting the polymerization of pitch. However, it is difficult to inhibit the formation of bubbles adequately in the heat-treatment step and this makes it impossible to increase the rate of temperature elevation.

In the method described in "Tanso", ibid., no more than 5% of sulfur was added to pitch softening at 185° C. and a heat treatment was conducted at 450° C. to increase the softening point to 320° C., and the resulting sample was molded and heat-treated. The relationship between the evolution of $H_2S$ and the temperature was such that comparatively satisfactory results were obtained only when extremely thin-walled shaped parts were heat-treated at a very slow heating rate of 0.1° C./min. A binder or matrix pitch is shaped together with an aggregate and other components of a composite carbon material to be produced but in the method proposed by "Tanso", ibid., the pitch was too viscous to be thoroughly impregnated in interstices in the aggregate, thus making it impossible to attain high mechanical strength.

As described above, various studies have so far been made with a view to producing a variety of high-performance composite carbon materials at low cost. However, none of them are yet to be completely satisfactory and composite carbon materials have to be produced by a complicated process over a prolonged time.

SUMMARY OF THE INVENTION

The present invention has been accomplished under these circumstances and its principal object is to produce a composite carbon material of high performance by a simple process and at a lower cost.

The present inventors conducted intensive studies in order to develop an effective process for producing composite carbon materials of high performance. As a result, they found that by adding a specified amount of sulfur to the mesophase pitch, the softening point dropped markedly to yield excellent characteristics as exemplified by efficient impregnation, and the resulting composition could advantageously be used as a carbonaceous binder or matrix or the like in the production of composite carbon materials. It was also found that the composition had such unique properties that upon heating, it was readily stabilized and solidified to yield a desired composite carbon material.

In its first aspect, the present invention relates to a composition for use in the production of composite carbon materials that comprises a mesophase pitch containing at least 80% of an optical anisotropic phase and having a softening point of no higher than 250° C., and sulfur present in an amount of 6–35 parts by weight per 100 parts by weight of said mesophase pitch.

In its second aspect, the present invention relates to a composite carbon material that is produced by heating the above-specified composition together with an aggregate and subsequently shaping the composition.

In its third aspect, the present invention relates to a process for producing a composite carbon material that comprises impregnating an aggregate with the above-specified composition as It is melted, shaping the mixture in a temperature range of 150°–350° C., and then carbonizing the shaped part.

DETAILED DESCRIPTION OF THE INVENTION

The term "optical anisotropic phase" as used in the present invention means that cross-sectional part of a pitch mass as solidified at a temperature close to the ambient which, when ground, polished and observed with a reflecting optical microscope under crossed Nicols as the sample or the crossed Nicols are rotated, produces observable luminance. The term "mesophase pitch" means a pitch containing an optical anisotropic phase. The softening point of pitch was measured by means of a Kohka type flow tester. 2 grams of pitch was packed into the measurement well and heated at a rate of 6° C./min under a pressure of 10 kgf/cm$^2$.

The composition of the present invention has the following three major characteristics: (1) its softening point is much lower than that of the starting mesophase pitch and, hence, low viscosity can be obtained at low temperatures on the order of 160° C., thus enabling the pitch component to be easily impregnated in the aggregate; (2) the molecular weight of the mesophase pitch will increase even at low molding temperatures on the order of 150°–350° C., thereby permitting the mesophase pitch to be stabilized and solidified continuously and, as a result, the pitch can be inhibited or effectively prevented from flowing out or deforming in the step of carbonization subsequent to molding; and (3) the addition of sulfur contributes to a higher yield of carbonization, so the pitch can be carbonized at a high rate of temperature elevation and with high yield. Because of these characteristics, the composition of the present invention can advantageously be used as a carbonaceous matrix or binder in the production of composite carbon materials.

The mesophase pitch to be used in the present invention may be derived from either coals or petroleums. It is particularly preferred to use a pitch that is low in softening point but which permits high yield of carbonization. Advantageous examples of a pitch that satisfied this condition are those pitches which are obtained by polycondensation of naphthalene and other condensed polycyclic aromatic hydrocarbons as described in U.S. Pat. Nos. 4,789,455, 4,891,126, EP 430689, etc.

The mesophase pitch to be used in the present invention contains at least 80%, preferably at least 90%, of the optical anisotropic phase. If the content of the optical anisotropic phase is less than 80%, the yield of carbonization of the mesophase pitch per se will decrease, so the final yield of carbonization cannot be increased to an adequate level even if the molecular weight of the pitch is increased in the low temperature range. Instead, the density of the shaped part is reduced, which is disadvantageous for producing a composite carbon material having satisfactory performance. Under the circumstances, the mesophase pitch to be used is preferably such that it can be carbonized with a yield of at least 75%, more preferably at least 80%.

The mesophase pitch to be used in the present invention has a softening point not higher than 250° C. If its softening point is higher than 250° C., stabilization or solidification due to the reaction for increasing the molecular weight will have proceeded before it passes through a stage where the viscosity of the pitch has dropped by a sufficient degree to permit its impregnation, thus making it difficult to insure that the aggregate is effectively impregnated with the pitch.

The composition of the present invention which is to be used in the production of composite carbon materials is prepared by mixing the above-described mesophase pitch with sulfur. The mixing may be carried out by either a wet or a dry method, which are commonly employed to mix powders. It should, however, be noted that in order to assure intimate mixing, the mesophase pitch and sulfur are desirably mixed in a fine particulate form, with the particle size being less than 100 μm, preferably less than 40 μm. The mixing operation may be carried out by kneading or blending the ingredients under such a mild condition as to prevent the drop in fluidity due to the polymerization reaction of the mesophase pitch. It is also within the scope of the present invention to add an aggregate component simultaneously with the preparation of the composition, whereby preparing a molding material.

The mesophase pitch of the present invention contains sulfur in an amount of 6–35 parts by weight, preferably 10–35 parts by weight, per 100 parts by weight of the pitch. If the sulfur content is less than 6 parts by weight, the improvement in the yield of carbonization is not satisfactory. In addition, the softening point of the composition is not sufficiently lowered to attain the objects of the present invention. On the other hand, if sulfur is added in an amount exceeding 35 parts by weight, it will partly remain unreacted, leading to only diseconomy. What is more, the mechanical performance of the shaped part may be adversely affected.

The sulfur added in the manner described above is effective in lowering the softening point of the mesophase pitch by a substantial degree. Depending on the amount of sulfur addition and the softening point of the mesophase pitch, the addition of sulfur is effective in achieving a substantial drop in softening point by 20°–80° C. compared to that of the mesophase pitch as a component of the composition.

The mesophase pitch containing more than 80% of the optical anisotropic phase has a softening point of at least 200° C. It was entirely unknown in the art that by adding no more than 35% of sulfur (m.p. 115.2° C.), a pitch having a much lower softening point than the mesophase pitch could successfully be obtained. Details of the mechanism behind this phenomenon are still unclear but, most probably, a certain interaction such as a compatibilizing action may be in force.

The relationship between the addition of sulfur and the drop in the softening point of mesophase pitch is described below in greater detail. In the present invention, sulfur acts effectively on a mesophase pitch having a softening point that is not higher than a comparatively low specified level, thereby lowering its softening point. If the softening point of the pitch is higher than the specified level, it will react with sulfur to such an extent that its stabilization or solidification will proceed without passing through the stage of softening or melting. For this reason, the present invention requires using a mesophase pitch that softens at a temperature not higher than 250° C. The ability of sulfur to lower the softening point of the pitch increases with the sulfur content; therefore, if the softening point of the pitch is on the higher side of the temperature range not exceeding 250° C., the low viscosity at low temperature which is necessary for accomplishing satisfactory impregnation and molding can be attained by incorporating sulfur in a comparatively large amount. By satisfying those conditions, the composition of the present invention enabled the production of 4-mm thick shaped carbon specimens of high density and strength at heating rates higher than 5° C./min as will be demonstrated in the working examples to be described later in this specification.

In short, the present invention aims at improving the efficiency of pitch impregnation in the production of shaped carbonaceous articles and subsequent heat treatment and its accomplishment is based on the finding that by using a mesophase pitch softening at a temperature not higher than a specified level and by adding sulfur in an amount within a specified range, shaped carbonaceous materials of high density and strength can be produced at high heating rate. These meritorious effects cannot be attained by the method described in "Tanso", No. 119, ibid. and, hence, this reference does not suggest the present invention. Stated more specifically, the reference contains the following passage in the Introduction: "A petroleum asphalt was distilled to result in raw pitch with softening point of 320° C.". As this passage suggests, what was done in the cited method was to add sulfur ($\leq 5\%$) to a pitch whose softening point had been increased to facilitate its stabilization. A satisfactory shaped article was obtained only when specimens 1.5 mm thick that were prepared by hot pressing were heat-treated at a low heating rate of 0.1° C./min.

In the present invention, the added sulfur starts to react slightly with the mesophase pitch at ca. 130° C. and reacts actively and exothermically with the mesophase pitch at ca. 150°–350° C., thereby increasing the molecular weight of the pitch. If the addition of sulfur is high, the mesophase pitch will be established or solidified straightforwardly and it will work as if it were a thermosetting resin. The mesophase pitch whose molecular weight has been increased in the manner described above can be subsequently heat-treated at a significantly higher rate of temperature elevation than in the case where sulfur is absent and, furthermore, the yield of carbonization is increased.

The composition of the present invention offers the following advantages if it is used as a carbonaceous matrix or binder. It contains as a chief component a mesophase pitch that has a high content of optical anisotropic component and which has a higher softening point than conventional tar pitches. Nevertheless, on account of the interaction mentioned above, the composition passes through the stage of adequately low viscosity in the initial period even if the temperature is as low as ca. 160° C., thereby enabling the pitch component to be impregnated in the aggregate satisfactorily. Further, even at low molding temperatures of ca. 150°–350° C., the molecular weight of the mesophase pitch will increase by a sufficient degree to enable its stabilization and solidification. Therefore, the pitch can be inhibited from flowing out or deforming by itself in the subsequent step of carbonizing the shaped part and this permits heating at a rate of 5° C./min or more up to a temperature that is sufficient to effect carbonization. In addition, the high yield of carbonization helps perform carbonization with a sufficiently high efficiency to give products of high performance.

A composite carbon material can be produced from the composition of the present invention by various methods. As already discussed above, the composition permits efficient impregnation of the mesophase pitch at low temperatures and it can be heated for satisfactory stabilization and solidification. Hence, as in the case of thermosetting resins like phenolic resins, the composition of the present invention may be impregnated in carbon fiber cloths, felts, etc. to form prepregs, which are stacked in a mold and heated either until the molecular weight of the composition is increased to such an extent that it withstands carbonization and other subsequent steps, or until it is stabilized or solidified to give a desired shape. Alternatively, the pitch may be preliminarily blended with chopped carbon fibers and subjected to a suitable molding process such as hot pressing, extrusion or injection. The shaped part thus obtained is carbonized or otherwise heat-treated in the usual manner and, if necessary, it may be subjected to re-impregnation or some other suitable treatment for increasing the density.

Examples of the aggregate that can be used in the composite carbon material of the present invention include, but are not limited to, a carbon fiber assembly, chopped carbon fibers and fine coke particles. Conventionally, it has been necessary to effect heating up to a temperature of at least 400°–600° C. in order to mold carbon composites using the mesophase pitch and, to this end, prolonged heating must be carried out at a very small rate of temperature elevation. In contrast, the present invention enables the molding step to be completed within a short time at low temperatures of 150°–350° C. and at a high speed of temperature elevation. Furthermore, following the carbonization, a composite carbon product having satisfactory performance can be obtained with high efficiency.

The following examples are provided for the purpose of further illustrating the present invention but are in no way to be taken as limiting.

EXAMPLE 1

Naphthalene was polycondensed in the presence of a $HF/BF_3$ catalyst to obtain a mesophase pitch having a softening point of 202° C. and containing 99% of an optical anisotropic phase. A hundred parts of this mesophase pitch was mixed with 25 parts of sulfur as they were pulverized with a mixer. The composition thus prepared had a softening point of 150° C.

Twelve grams of this composition were mixed with 57 g of calcined fine coke particles (average size: 3 μm). The mixture was placed in a heatable mold (80 mm$^\phi$), heated up to 300° C. at a rate of 5° C./min with pressure applied at 500 kg/cm$^2$, and held at that temperature for 10 min. After cooling, the shaped part was taken out of the mold and carbonized by heating up to 900° C. at a rate of 10° C./min under atmospheric pressure in a nitrogen atmosphere. The yield of carbonization was 88% on the basis of the weight of the composition.

The shaped part in plate form had a dense structure and was free from any observable deformation and trace of bubble formation due to the melting of mesophase pitch. The apparent bulk density of this plate was 1.75 g/cm$^3$.

A test piece measuring 35 mm × 10 mm × 4 mm was cut from the plate and subjected to a three-point bending test with a pressure being applied at a rate of 1 mm/min to the test piece as it was supported on bars spaced apart by a distance of 20 mm. The test piece was found to have a satisfactory bending strength of 10.1 kg/mm$^2$.

EXAMPLES 2-5 AND COMPARATIVE EXAMPLES 1-4

Mesophase pitches having various properties were synthesized from naphthalene. To those pitches, sulfur was added in varying amounts to prepare composition samples, which were shaped and heat-treated in the same manner as in Example 1.

The properties of the mesophase pitches used, the amounts of sulfur addition, the softening points (s.p.) of the composition samples obtained, as well as the properties of the shaped parts and the yields of their carbonization are shown in Table 1 below.

invention, the temperature for pitch impregnation and subsequent molding in the production of composite carbon materials can be markedly lowered. Further, the bubble formation and deformation which would otherwise occur in the step of carbonization can be effectively prevented to insure the production of shaped articles with high yield and efficiency.

The present invention thus enables composite carbon materials to be produced from mesophase pitch at a significantly lowered cost. Phenolic resins in current use have such low heat resistance that the materials strength will decrease at elevated temperatures; however, the composite carbon material of the present invention has a thermosetting property but also high heat resistance and, hence, it is anticipated to find new and different applications than the conventional composite carbon materials.

TABLE 1

| | Mesophase pitch | | | | Shaped part (after carbonization at 900° C.) | | | |
|---|---|---|---|---|---|---|---|---|
| Run No. | s.p. (°C.) | content of optical anisotropic phase (%) | sulfur addition (parts) | s.p. of mesophase pitch/sulfur composition (°C.) | bulk density (g/cm$^3$) | yield of carbonization (%) | bending strength (kg/mm$^2$) | appearance |
| Ex. | | | | | | | | |
| 2 | 196 | 85 | 10 | 151 | 1.66 | 81 | 7.5 | good |
| 3 | 219 | 100 | 15 | 168 | 1.72 | 85 | 9.8 | good |
| 4 | 219 | 100 | 25 | 137 | 1.82 | 91 | 10.5 | good |
| 5 | 235 | 100 | 30 | 160 | 1.83 | 93 | 8.3 | good |
| Comp. Ex. | | | | | | | | |
| 1 | 196 | 85 | 0 | 196 | — | 74 | — | melted and foamed |
| 2 | 235 | 100 | 0 | 235 | — | 78 | — | melted and foamed |
| 3 | 183 | 50 | 25 | 133 | 1.59 | 86 | 4.2 | good |
| 4 | 261 | 100 | 30 | no | 1.50 | 95 | 3.1 | good |
| 5 | 219 | 100 | 4 | 210 | — | 78 | — | melted and foamed |
| 6 | 219 | 100 | 50 | 124 | 1.60 | 84 | 3.5 | good |

The composition sample prepared in Comparative Example 4 showed no clear softening point because the reaction between sulfur and mesophase pitch proceeded to give an infusible pitch before softening of the composition.

In Comparative Examples 1, 2 and 5, the amount of sulfur addition was insufficient to increase the molecular weight of mesophase pitch by an adequate amount under molding conditions as efficient as in Example 1. Instead, the shaped parts melted and formed bubbles, thus becoming entirely unsuitable for use in the measurement of bulk density or in the testing of flexural strength.

The composition of the present invention has the advantage that its softening point is very low on account of the unique interaction between mesophase pitch and sulfur. Therefore, its molecular weight will increase at comparatively low temperatures to permit the progress of stabilization and solidification by a sufficient degree to increase the yield of subsequent carbonization. Hence, by using the composition of the present

What is claimed is:

1. A composition for use in the production of composite carbon materials comprising a mixture of mesophase pitch and sulfur wherein said mesophase pitch contains at least 80% of an optical anisotropic phase and has a softening of no higher than 250° C. and wherein said sulfur is present in said mixture in an amount of 6–35 parts by weight per 100 parts by weight of said mesophase pitch.

2. A composition according to claim 1 wherein said mesophase pitch has been prepared by polycondensation of a condensed polycyclic aromatic hydrocarbon.

3. A composition according to claim 2 wherein said condensed polycyclic aromatic hydrocarbon is naphthalene.

4. A composition according to claim 1 wherein the content of said optical anisotropic phase is at least 90%.

5. A composition according to claim 1 wherein said sulfur is present in an amount of 10–35 parts by weight per 100 parts by weight of the mesophase pitch.

* * * * *